April 25, 1961 C. G. McILWRAITH ET AL 2,981,111
INSTRUMENT FOR INDICATING FLUID DENSITY
Filed Feb. 28, 1957 2 Sheets-Sheet 1
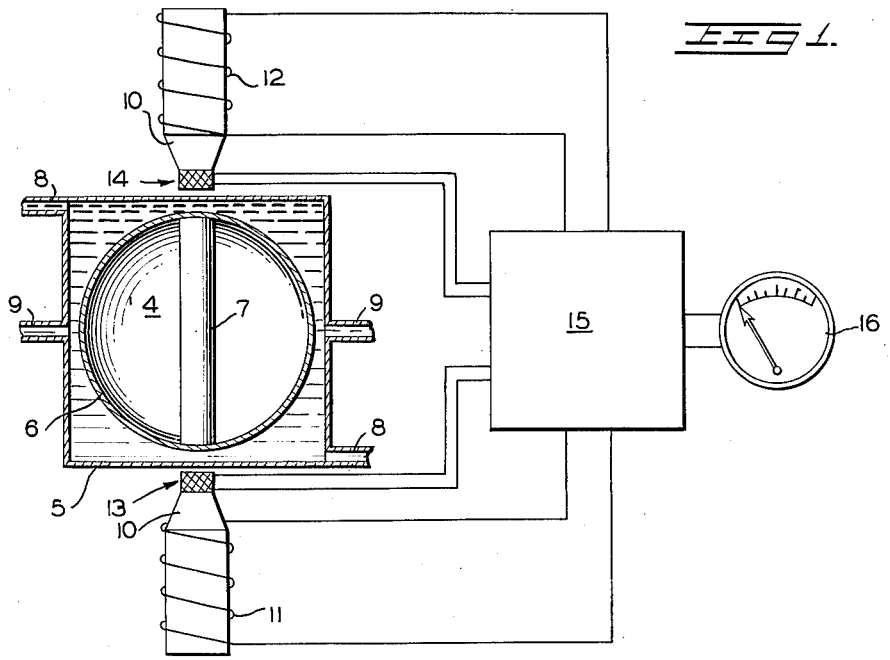
Fig 1.
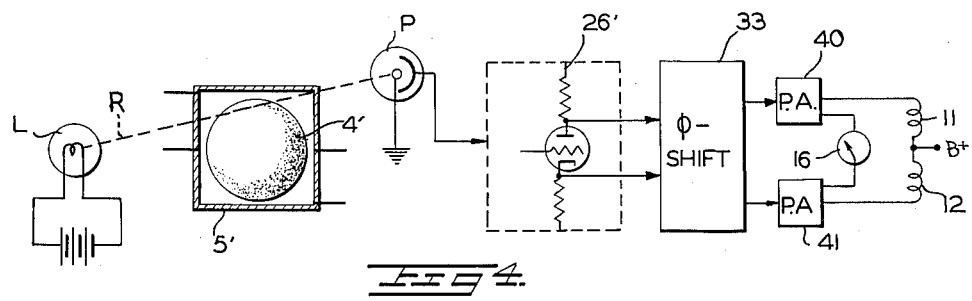
Fig 4.
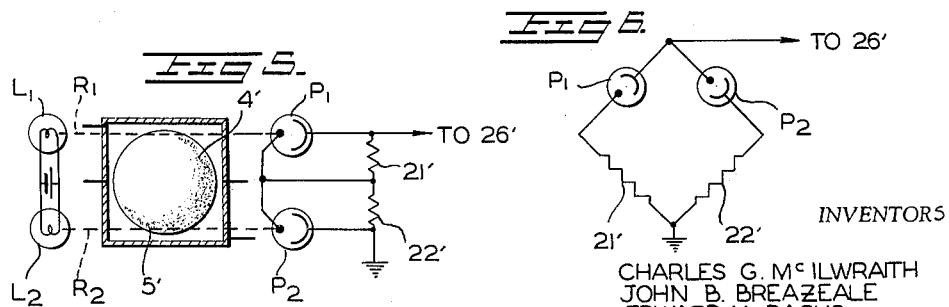
Fig 5.
Fig 6.
INVENTORS
CHARLES G. McILWRAITH
JOHN B. BREAZEALE
EDWARD N. DACUS
BY Harmon & Pierce
ATTORNEY April 25, 1961   C. G. McILWRAITH ET AL   2,981,111
INSTRUMENT FOR INDICATING FLUID DENSITY
Filed Feb. 28, 1957   2 Sheets-Sheet 2
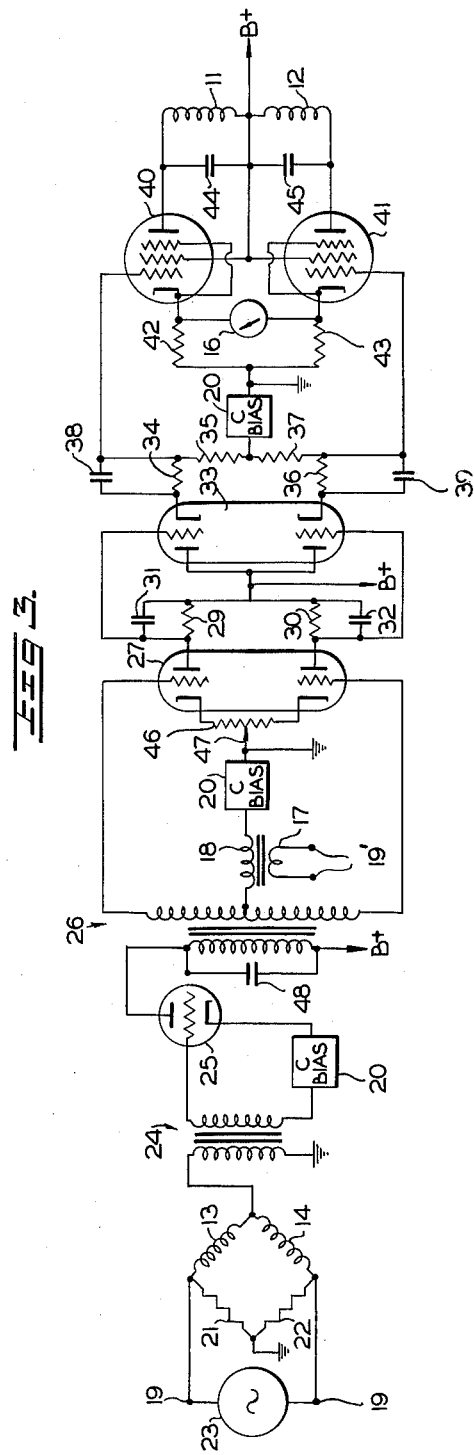
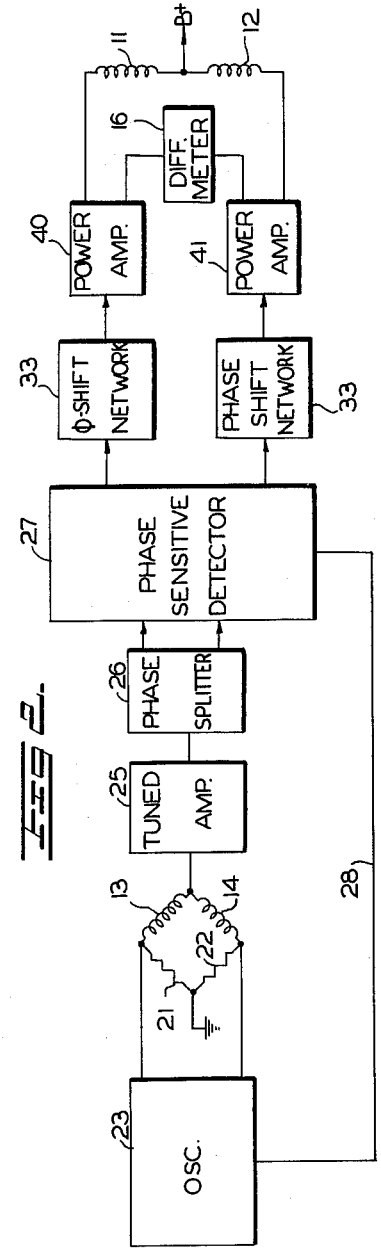
INVENTORS
CHARLES G. McILWRAITH
JOHN B. BREAZEALE
EDWARD A. DACUS
BY Harmon & Pierce
ATTORNEY

United States Patent Office 2,981,111
Patented Apr. 25, 1961

2,981,111

INSTRUMENT FOR INDICATING FLUID DENSITY

Charles G. McIlwraith, Rancho Santa Fe, John B. Breazeale, Solana Beach, and Edward N. Dacus, Rancho Santa Fe, Calif., assignors to Bill Jack Scientific Instrument Co., Solana Beach, Calif., a corporation of California Filed Feb. 28, 1957, Ser. No. 643,138

3 Claims. (Cl. 73—453)

The present invention relates to a magnetic apparatus and instrument for measuring fluid density. Electromagnetic means are utilized to position a ferromagnetic float in a body of liquid whose density is to be measured, and variations in the buoyant force acting on the float caused by density changes are converted into electrical signals which signals may be used to express a measure of the fluid density as well as to actuate a servo follow-up system to reposition the float.

It is an object of the present invention to employ magnetic suspension principles to effect the measurement of fluid density by utilizing a combination of magnetic forces and buoyant forces.

Another object of the present invention is to provide a measuring apparatus having a ferromagnetic float which is totally immersed in a quantity of fluid whose density is to be sampled in such a manner that the float position tends to be affected, at least in part, by the density of the fluid sample. By providing sensing means to detect changes in the float position due to the buoyant force acting on the float, the desired density measurement may be carried out.

A more specific object of the present invention is to provide a continuous density measurement apparatus in which the measuring means, except for the float itself, is not immersed in the fluid under test.

An additional specific object of the present invention is to provide a fluid density measuring apparatus which is free from errors due to surface tension, because the float is totally immersed.

A further specific object of the present invention is to provide density measurement apparatus employing a fluid sample chamber containing a float in which the desirable features of permitting a wide range of selection of materials for said chamber and float appropriate to the fluid sample; of requiring a minimum volume of sample fluid; and of providing a very short response time together with extreme accuracy, are readily achieved.

An additional object of the present invention supplementary to those aforementioned is to provide a fluid density measuring instrument combining magnetic, electric and hydraulic principles in a novel manner such that the required measurement is developed as an electrical quantity which may be displayed remotely, or at several locations simultaneously, or may be employed as the input to electronic computer devices.

The foregoing and additional objects and advantages will be apparent from the following detailed description of preferred embodiments of the present invention taken with reference to the accompanying drawings, wherein:

Figure 1 is a diagrammatic representation of one form of fluid density measurement apparatus according to the present invention;

Figure 2 is an electrical block diagram showing sensing and control circuits utilized in the embodiment of Figure 1;

Figure 3 indicates a circuit diagram of elements which may be used in practicing the present invention;

Figure 4 represents an alternative embodiment of the present invention; and

Figures 5 and 6 indicate modifications of the embodiment of Figure 4.

The principle of operation of the instrument for measuring fluid density is indicated in Figure 1 which represents the complete apparatus. Figure 1 shows, in section, a float 4 within a sample chamber 5. The float 4 may comprise a relatively thin hermetically sealed shell 6 having a ferromagnetic core element 7, and assembled in such a manner as to contain dry air or other inert material. The materials and dimensions of the float assembly are selected such that the mean density of said float may be substantially that of the fluid whose density is to be measured, consistent with adequate mechanical strength, while preferably being formed of material not readily affected by the fluid under test.

Float assemblies according to the invention having a density less than 0.5 gram per cubic centimeter are practicable, and densities greater than one gram per cubic centimeter are readily obtainable. Alternatively the float 4 may consist solely of a sealed hollow shell similar to shell 6 if such shell is fashioned of ferromagnetic material.

Sample chamber 5, which is indicated as cylindrical in shape, is constructed so as to provide a finite, but small clearance for float 4 which is housed therein. Inlet tubes 8 and outlet tubes 9 are indicated diagrammatically in Figure 1. The exact number, shape, and location of these tubes being so chosen as to maintain a uniform and steady flow of sample fluid through the chamber, while avoiding the exertion of any dynamic forces upon float 4. Although sample chamber 5 is shown as a cylinder, it may obviously be made in any desired shape. It is preferred to shape such chamber so as to require only a small volume of sample fluid to fill it.

A pair of electromagnets 10 are positioned outside of the sample chamber on the extended central axis thereof, and are provided with energizing windings 11 and 12 as indicated. Sensing elements 13 and 14 are located on the two pole faces of magnets 10 closely adjacent to the lower and upper end walls, respectively, of sample chamber 5. Elements 13 and 14 constitute proximity sensing devices, indicated in Figure 1 as coils which are within a magnetic flux area of the ferromagnetic float core 7. When appropriately energized coils 13 and 14 will undergo a change in inductance upon vertical movement of float 4, and thus generate signals which are proportional to the proximity of said float to one or the other of the two electromagnets 10.

The proximity signals from sensing elements 13 and 14 are connected to the input of a servo control amplifier generally designated by numeral 15. Element 15, by means to be further detailed in connection with Figures 2 and 3, controls the currents in windings 11 and 12 so that the float 4 assumes and maintains a position midway between the poles of the magnets 10, and free of contact with the walls of sample chamber 5.

Under these established conditions the float 4 will be subjected to a downward force acting upon it which is the sum of its weight in the fluid sample plus the magnetic force created due to winding 11 of the lower electromagnet 10. Float 4 also undergoes an upward magnetic force exerted by the upper electromagnet 10 as created by winding 12 thereof. When the servo positioning system is in balance, the vector sum of these three elemental forces will be zero. The weight of float assembly 4 is its weight in vacuum minus the buoyancy due to the displaced fluid sample, which weight may be expressed as:

$$W_s = W_v - V\delta \quad (1)$$

where $W_s$ is the float weight in the sample fluid; $W_v$ is the float weight in vacuum; $V$ is the float volume; and $\delta$ is the density of the sample fluid. Solving Equation 1 for the sample density, we obtain:

$$\delta = \frac{W_v - W_s}{V} \quad (2)$$

Since, for any particular float construction, $W_v$ and $V$ are determinable constants, the formula for the density of the sample fluid may be reduced to:

$$\delta = K \cdot W_s \quad (3)$$

It will now be apparent that the combination of float 4, magnets 10, sensing elements 13 and 14, positioning windings 11 and 12, and control amplifier 15 constitutes a servo system, in which any force acting upon the float 4 to displace it axially from a mid-position is opposed by magnetic forces tending to hold it in such position. The magnetic forces are created by currents in windings 11 and 12, and hence a differential electric meter 16 may be connected so as to indicate a reading proportional to these currents, which currents are related to the weight of the float 4 in the fluid sample, $W_s$. By properly proportioning the constants, sensitivity, and/or scale marking of meter 16 it may be made to directly indicate the fluid density according to the formula set out in Equation 3.

The servo control amplifier 15 may take a variety of forms. Figure 2 represents one form of density measuring apparatus according to the invention including the block elements of a servo amplifier 15 which illustrates the principles involved, without detailing the electric circuitry which will be obvious to those skilled in the art.

Coils 13 and 14 are the sensing elements of Figure 1. Coils 13 and 14, together with resistors 21 and 22, constitute an alternating current bridge, which is excited by the oscillator 23. Coils 13, 14 and resistors 21, 22 are of complementary values at the operating frequency of source 23, such that the bridge will be balanced and have a zero voltage output when the float 4 is midway between the magnets 10 of Figure 1. If float 4 moves toward either magnet the bridge will become unbalanced because the inductance of coils 13, 14 is dependent upon the proximity of the float core 7, and a signal will appear across the bridge whose phase, with respect to oscillator 23, will indicate the direction of float movement, and whose amplitude will indicate the magnitude of departure of the float from the aforesaid mid-position.

The bridge output constitutes an error signal which is amplified by amplifier 25, then divided or split into two signals which are of equal amplitude but 180 degrees out of phase with each other by the device 26. Thus there is provided a balanced pair of error signals suitable for influencing the positioning currents flowing through windings 11, 12 of the pair of electromagnets 10.

A dual channel phase sensitive detector 27 is provided to convert the paired alternating current error signals into paired direct current error signals whose magnitude and polarity correspond to the amplitude and phase of the input A.C. signals. In accordance with known phase detection techniques a reference voltage from oscillator 23 is provided over lead 28.

The direct current outputs of phase detector 27 are used to control the power supplied to windings 11 and 12 from the respective amplifiers 40 and 41. Preferably each detector output error signal is connected to the input of its respective power amplifier through a phase shift or phase advance network, which functions to provide an error signal which is shifted in phase with respect to the detector output signal by an amount sufficient to stabilize the servo loop and prevent oscillation of the float 4 which might otherwise occur.

Windings 11 and 12 serve to position the float 4, therefore a differential electric meter 16 may be connected so as to indicate differential changes in the currents flowing in 11 and 12 in response to forces acting axially on the float, as, for example, due to a change in density of the fluid within sample chamber 5. The reading of meter 16 will be representative of the density of the fluid sample.

Reference may be made to Figure 3 for a more detailed electrical diagram of the embodiment shown in Figure 2. Oscillator 23 energizes the A.C. bridge 13, 14, 21, 22 and the error signal output thereof is coupled by transformer 24 to amplifier 25. Amplifier 25 is shown as a triode stage whose grid element may be suitably biased from a "C-bias" source indicated at block element 20, and whose plate output circuit includes the primary of a center-tapped phase-splitting transformer 26. A condenser 48 may optionally be included in order to resonate the transformer primary winding at the frequency of oscillator 23.

The phase sensitive detector 27 includes a dual triode tube whose grids receive error signals from the secondary of transformer 26 which differ in phase by 180 electrical degrees. It should be noted that at a particular instant of time one such grid signal will be in phase with the output of the oscillator 23, and the other out of phase, dependent upon the direction of movement of the float 4 from its position in the fluid midway between the magnets 10.

An output from terminals 19 of oscillator 23 is coupled to terminals 19' of phase detector 27 to provide a reference switching wave to convert the A.C. error signals into D.C. signals. The reference wave input at terminals 19' energizes transformer primary winding 17 and serves to alternately bias the phase detector grids to cutoff for negative excursions of the oscillator output due to the inclusion of transformer secondary winding 18 in the grid bias connection to bias source 20. Considering the upper triode section of detector 27, if an input signal is supplied to its grid which coincides in phase with the grid bias furnished by transformer winding 18 the effect will be additive and the triode will conduct drawing increased current through its plate resistor 29. If, however, the input error signal is 180 degrees out of phase with the reference bias signal, the effect will be subtractive and current through resistor 29 will decrease. Lower triode section of detector 27 operates in a similar manner, but the currents through its plate resistor 30 will be opposite to those of resistor 29, thus when the output of one section increases the other decreases.

Due to the switching action of the reference voltage input wave, voltage addition is thus effected in a well known manner, so that detector 27 converts the two A.C. error signals into two direct current signals. The currents through plate resistors 29 and 30 charge the plate condensers 31 and 32, respectively, and the D.C. output error voltages developed across the condensers are fed to a dual triode cathode-follower phase-shifting stage indicated at 33.

The phase-shift network is of the balanced type utilizing negative cathode bias provided by a source 20. A phase-shifted error signal output from the upper triode section is taken off at the junction of the series-connected cathode resistors 34, 35; while that of the lower triode is taken at the junction of the cathode resistors 36, 37. The amount of phase-shift at the selected operating frequency is determined by the values of condensers 38, 39.

One of the phase corrected direct current error signals controls amplifier tube 40 whose plate current excites the magnet positioning winding 11, while the other corrected error signal effects the excitation of winding 12 in a similar but opposite manner through amplifier tube 41. Condensers 44 and 45 are preferably connected in parallel with the windings 11 and 12, respectively. When the float 4 is midway between the magnets 10 the plate currents of tubes 40 and 41 will be equal, the currents through their respective cathode resistors 42 and 43 will be the same, and hence the voltage between these two cathodes will be zero, and the differential meter 16 connected between the cathodes will read "zero," which in such a meter is a center-scale representation. The meter 16 may be balanced at this zero potential point for a known float and fluid density value by means of the tap 47 of a potentiometer 46 which is located in the cathode-grid path of the twin-triode of phase detector 27.

If now an upward force is exerted on the float 4, as by an increase in the density of the sample fluid surrounding it, this will result in an increase of current through winding 11 and a decrease through winding 12 until the float is again in equilibrium. This will result in a potential difference between the cathodes of tubes 40 and 41, and cause meter 16 to give a reading which can be related to the changed density of the sample fluid.

It will be noted that differential meter 16 is merely representative of one mode of electrical presentation of the density measurement which may be provided by the apparatus of the present invention. Obviously one may derive plural or remote meter readings at the cathode resistors 42 and 43, as well as input signals for electrical computers and "read-out" devices in a manner known to those skilled in the art.

It will be understood that the description of Figures 1 to 3 applies to an embodiment and mode of operation which has been found convenient in practice, but which should by no means be considered as limiting, for other modes of operation are possible. For instance, the phase advance or phase-shift may be applied by a single network 33 to the A.C. error signal before the phase detector 27.

As an alternative embodiment, the position sensing element may comprise a single photo-electric cell P, as indicated in Figure 4. In such a modification, the float 4' would be of an opaque material or finish so as to variably mask the light rays emitted by the D.C. excited lamp L, and the sample chamber 5' should be either constructed of a transparent material or else be provided with windows along the light ray path indicated by the dashed line R. The output error signal generated by photocell P may be fed to a phase-splitter 26', indicated diagrammatically in Figure 4 as being of the type embodying a triode tube provided with equal plate and cathode load resistors. The remaining circuit elements 33, 40, 41, 16, 11 and 12 would be as shown in Figures 2 and 3. This mode of operation makes it possible to omit the oscillator 23, A.C. amplifier 25, and phase detector 27.

Other alternative embodiments using two photocells as sensing elements are illustrated in Figures 5 and 6. Here the excitation source is indicated as a pair of D.C.-excited lamps $L_1$, $L_2$ furnishing light rays over two substantially parallel paths $R_1$, $R_2$, but it is obvious that a single light source could be used if desired. The error signal is developed by the network $P_1$, $P_2$, and resistors 21' and 22', two different possible network arrangements being shown in Figures 5 and 6, and such output error signal is fed into a phase-splitter 26' and subsequent circuit elements as shown in Figure 4.

We claim:

1. An instrument for detecting and indicating changes in density of a fluid sample comprising, in combination, a fluid sample chamber, a ferromagnetic float element immersed in the fluid within said chamber, means for directing a continuous flow of sample fluid through said chamber, electromagnetic float positioning means to maintain said float positioned in equilibrium against the combined forces of gravity and buoyancy of the fluid sample, said positioning means comprising a pair of aligned electromagnetic coils mounted in substantially vertical alignment above and below said chamber, sensing means to detect changes in float position due to changes in density of said fluid sample, said sensing means comprising a pair of electrical coil members positioned above and below the chamber in substantially coaxial alignment with said positioning electromagnetic coils, each said sensing coil being positioned between an electromagnetic coil and the chamber, means interconnecting the sensing means and positioning means to cause the latter means to generate forces to reposition said float to its equilibrium position upon said changes in fluid density, and continuous density indicating means responsive solely to the repositioning forces generated by said electromagnetic float positioning means.

2. An automatic instrument for continuously measuring fluid density, comprising a chamber containing a free sealed float, said float being wholly or in part made of magnetic material, means for directing a continuous flow of sample fluid through said chamber, means external to said chamber for sensing the vertical position of said float within said chamber, force generating means symmetrically disposed above and below said chamber responsive to said sensing means and generating forces acting on said float equal and opposite to any buoyant forces acting on said float, signal generating means deriving from said force generating means a signal directly related to said force and of a form suitable for operating recording or controlling means, said signal being directly responsive to changes of density of the fluid contained in said chamber.

3. A fluid density measuring apparatus comprising a fluid sample chamber, a float within said chamber, said float including a magnetic member, means including said float to create a flux field, means for directing a continuous flow of sample fluid through said chamber, float position sensing means arranged external to said chamber to generate an error signal if the float departs from a predetermined position in said chamber, said sensing means including electrical windings located in the flux field of the magnetic member, float positioning means external to said chamber responsive to the error signal to produce forces upon said float through said magnetic member to return said float to said predetermined position, said float positioning means being symmetrically disposed above and below said chamber, and means responsive solely to the produced positioning forces to continuously indicate the density of the fluid within said chamber.

References Cited in the file of this patent

UNITED STATES PATENTS

| | | |
|---|---|---|
| 1,589,039 | Anschutz-Kaempfe | June 15, 1926 |
| 2,451,036 | Martin et al. | Oct. 12, 1948 |
| 2,559,919 | Gustafsson | July 10, 1951 |
| 2,571,863 | Godsey | Oct. 16, 1951 |
| 2,635,461 | Groth et al. | Apr. 21, 1953 |
| 2,775,126 | Honick | Dec. 25, 1956 |
| 2,788,664 | Coulbourn et al. | Apr. 16, 1957 |

OTHER REFERENCES

Journal of the American Chemical Society, 1931, vol. 35; pp. 1666–1693.

The Review of Scientific Instruments, vol. 22; No. 8 August 1951, pp. 642–646.